L. M. Ferry,
Hose Coupling.
No. 1,186. Reissued May 21, 1861.
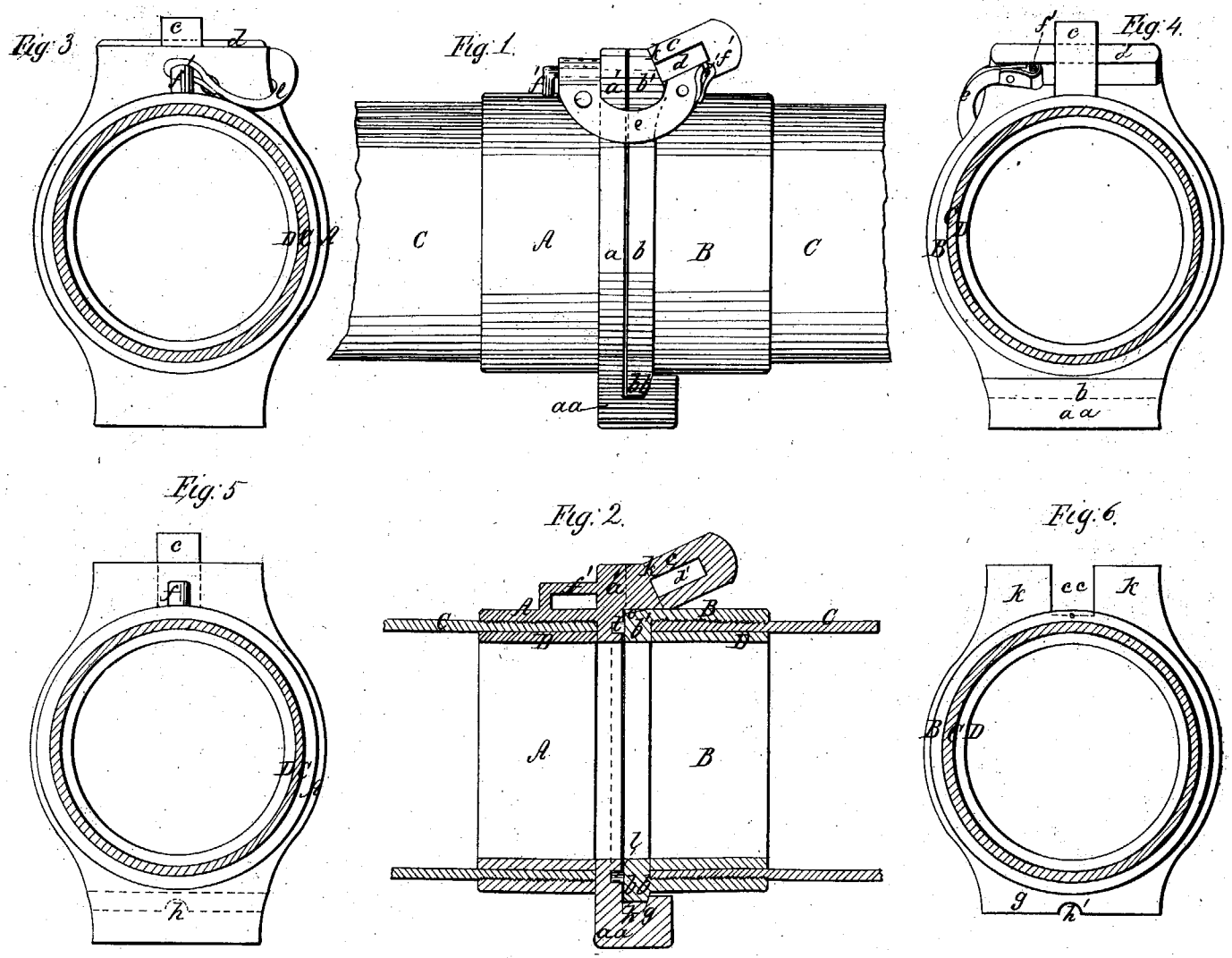
N. PETERS, PHOTO-LITHOGRAPHER, WASHINGTON, D. C.

UNITED STATES PATENT OFFICE.

EMERSON GAYLORD, OF CHICOPEE, MASSACHUSETTS, ASSIGNEE, BY MESNE ASSIGNMENTS, OF L. M. FERRY.

IMPROVEMENT IN HOSE-COUPLINGS.

Specification forming part of Letters Patent No. 15,846, dated October 7, 1856; Reissue No. 1,186, dated May 21, 1861.

*To all whom it may concern:*

Be it known that I, EMERSON GAYLORD, of Chicopee, in the county of Hampden and State of Massachusetts, am the sole assignee of JAMES T. AMES, of Chicopee aforesaid, assignee of L. M. FERRY, who invented the hereinafter-described Hose-Coupling; and I do hereby declare, for the purpose of obtaining a reissue, that the following is a full, clear, and exact description of the same, reference being had to the annexed drawings, making a part of this specification, in which—

Figure 1 is a side view of my invention; Fig. 2, a longitudinal section of the same; Figs. 3, 4, 5, and 6, end views of the same.

Similar letters of reference indicate corresponding parts in the several figures.

The object of this invention is to obtain a simple, economical, and efficient hose-coupling, one that may be very expeditiously connected, and a perfect water-tight joint formed.

To enable those skilled in the art to fully understand and construct my invention, I will proceed to describe it.

In the said drawings, A shows a hollow cylinder with an external flange, *a*, one side of one end, *a a*, being made in the form of a hook, and having upon the same side of the opposite end, *a'*, a projection or staple, *c*, with a hole, *d'*, made through it for receiving the key *d*, the said hollow cylinder A being connected with a hollow cylinder, B, by means of the flange *b* on the hollow cylinder B and the flange *a* and staple *c* on the hollow cylinder A, and held firmly in its place by the key *d* being driven through the hole *d'* in the staple *c*, and pressing the flange *b* firmly upon the packing Z, (made of leather or any other suitable material,) inserted in a groove made in the flange *a*, thereby making the joint water-tight between the flanges *a* and *b* of the two cylinders or parts A B of the coupling. The flange *a* on the end *a a* has a semicircular (or any other formed) projection, *h*, made inside of the hook, and the inside face, *g*, of the hook made beveling or inclining from the inside of the lip of the hook toward the face of the flange *a*. The staple *c* is made inclining outward, so as to allow the flange *b* of the part B to pass inside, which flange *b* on the end *b'* has a recess or notch, *c c*, of sufficient size to pass over the staple *c*, the said recess or notch *c c* having its end O beveled or inclined inward from near the face *k* of the flange *b*, to facilitate the passage of the flange *b* over the staple *c*. The flange *b* on the end *b'* has one face, *k*, beveled or inclined outward at such an angle as when the flange *b* is in its place the angle of inclination of the face *k* may be at right angles to the inclination of the staple *c*. In the opposite end, *b b*, of the flange *b* there is a semicircular (or any other formed) recess or notch, *h'*, corresponding to the projection *h* of the hook on the end *a a* of the flange *a*, and the beveled or inclined face *g'*, corresponding to the face *g* of the hook, by which means, when the flange *b* is forced toward the flange *a*, as when in the act of coupling hose, the face *g* by its inclination causes the flange *b* to press firmly upon the packing Z, and the flange *b* is kept from lateral motion by the projection *h* and the recess or notch *h'*, and the key *d* being driven through the hole *d'* in the staple *c*, and bearing upon the inclined surface *k*, prevents the two parts A and B from becoming detached from one another when coupled together. The key *d* is prevented from being lost by the leather strap *e*, attached on one end to the loop *f'* on the key *d*, and on the other end of the strap *e* attached to the loop *f'*, which is a part of the part A of coupling.

C is the hose, screwed inside of the parts A and B of the coupling, and is kept in place by the inside cylinder, D, placed inside of the hose C, and riveted through the hose C to the parts A and B of the coupling.

Having thus described my invention, what I claim as new, and desire to secure by Letters Patent, is—

1. Giving to one of the parts, B, a simultaneous vertical and lateral movement, substantially in the manner and for purpose herein shown and described.

2. The combination, with each other and with the parts A B, of the bevel lipped hook

*a a* and bevel-faced flange *b b*, in the manner herein shown and described.

3. Constructing the hook *a a* and flange *b b*, respectively, with hook and recess *h h'*, as and for the purpose herein shown and described.

4. The combination, with the parts A B, of the incline-faced flange *b'*, staple *c*, and wedge *d*, in the manner and for the purpose herein shown and described.

EMERSON GAYLORD.

Witnesses:

GEO. M. STEARNS,

H. H. HARRIS.